United States Patent [19]
Lush

[11] Patent Number: 5,901,490
[45] Date of Patent: May 11, 1999

[54] SCENT COVER AND ANIMAL FEED

[76] Inventor: Raymon Lush, 410 E. Main, Bloomfield, Nebr. 68178

[21] Appl. No.: 08/850,833

[22] Filed: May 2, 1997

[51] Int. Cl.$^6$ .................................................. A01M 27/00
[52] U.S. Cl. ........................................................ 43/1
[58] Field of Search ...................................... 43/1

[56] References Cited

U.S. PATENT DOCUMENTS

| | | | |
|---|---|---|---|
| 3,929,997 | 12/1975 | Matsui | 424/195 |
| 4,199,612 | 4/1980 | Fragas | 426/622 |
| 4,278,658 | 7/1981 | Hooper et al. | 424/65 |
| 4,302,899 | 12/1981 | DeHart | 43/1 |
| 4,423,626 | 1/1984 | Herschede | 73/186 |
| 4,609,245 | 9/1986 | Sakschek | 239/36 |
| 4,667,430 | 5/1987 | Ziese, Jr. | 43/1 |
| 4,735,010 | 4/1988 | Grinarmi | 43/1 |
| 4,788,787 | 12/1988 | Konietzki | 43/1 |
| 5,029,408 | 7/1991 | Smith | 43/1 |
| 5,060,411 | 10/1991 | Uhlman | 43/1 |
| 5,148,949 | 9/1992 | Luca | 222/175 |
| 5,327,667 | 7/1994 | Fore | 43/1 |
| 5,343,882 | 9/1994 | Iannone | 132/294 |
| 5,667,107 | 9/1997 | Lindsey | 222/173 |
| 5,672,342 | 9/1997 | Bell | 43/1 |
| 5,720,961 | 2/1998 | Fowler et al. | 424/401 |

FOREIGN PATENT DOCUMENTS

| 4233625 | 4/1994 | Germany | 43/1 |
|---|---|---|---|

OTHER PUBLICATIONS

"Stump Dust", www.deer.com/trophymix.html, Sugar Valley Products, Inc. Jul. 1996.
"Seven Steps to Scent Elimination", www.hunterspec.com/scent_elimination/7steps.html, Hunters's Specialties 1997.
"Scent Elimination Products", www.deerscent.com/elim.html, Buckskin Industries, Inc. 1996.
"Sex & Big Game Scents" www.buckstopscents.com/sex-biggame.html, Buck Stop Lure Co. Inc. prior to May 1996.
"Exciting New Products for 1998", www.wildlife.com/products98.htm#top, Wildlife Research Center 1998.
"Mineral Magic Deer Attractant", www.denroninc.com/index.htm, Denron, Inc. 1998.
Netscape Net Search Homepage Sep. 29, 1998.
Mighty Deer Lick Sweet Corn Pocket Block product label, unknown date.
Milligan Brand Fogger Sweet Corn Essence product label, unknown date.

*Primary Examiner*—Thomas Price
*Assistant Examiner*—Fredrick T. French, III
*Attorney, Agent, or Firm*—Zarley, McKee, Thomte, Voorhees & Sease; Dennis L. Thomte

[57] ABSTRACT

The present invention is directed to methods and apparatus for covering the scent of a human in order to avoid detection by wild game. The invention teaches use of scent covering material comprising ground sweet corn meal. A dispensing means is taught for containing the would comprise a storage compartment of resilient material and a dispensing nozzle releasably secured thereto such that upon exertion of pressure on the resilient storage compartment, a quantity of scent covering material is expelled. The scent cover may also include deer musk to further attract the wild game. Additionally, the method may include spraying a quantity of said scent cover on the pants leg of an individual; on surrounding trees and shrubs so as to attract deer and other wild game; and/or into the air in order to check the direction of the wind. Finally a material is taught for attracting and feeding the animals.

7 Claims, 3 Drawing Sheets

SCENT COVER AND ANIMAL FEED

BACKGROUND OF THE INVENTION

1. Technical Field

The present invention relates generally to a scent cover and wild game feed. More specifically, it relates to providing a sweet corn meal based feed and scent cover in both powder form and in block form. Additionally, cube and pellet form may be utilized as well as a coating for encapsulating wild bird and wild life feed.

The natural sweet corn powder used in the disclosed embodiments is highly attractive to deer, birds, squirrels, horses and other wild life enhancing its utility as both a scent cover and an attractant and feed for wild game. The methods disclosed by the present invention teach use of the attractant/scent cover in several modes. For example, the powder can be sprayed on the pants leg to cover the scent of the hunter. Additionally, the powder can be sprayed on trees, plants, and the like to attract deer or other wild game.

Whereas reference is made throughout the specification to wild game or wild life, the methods and feed described herein may equally well to more domesticated animals such as dogs, horses and the like. As a feed, it can be formed into solid blocks of various shapes and placed in various environments for consumption. The present invention contemplates mixing various additional ingredients such as sunflower seeds, millet, bird seed and the like, prior to forming the feed block.

Whereas the term "meal" is used throughout the specification, this term is meant to refer to any ground dry mature sweet corn ranging in consistency from wheat flour to coarse crumbles or chopped corn.

2. Description of the Prior Art

Hunters has been devising ways to disguise their presence and attract wild game since the beginning of time. Consequently, numerous decoy scents and mechanisms have been developed. No doubt many of these techniques are effective. However, many suffer the drawback of complexity or cost.

One such prior art is the Milligan Brand FOGGER sweet corn essence with deer musk. While this product is effective, it is quite expensive. Additionally, since it is in liquid form, it is not useful in some ancillary roles such as to check wind direction.

Another prior art example of an attractant is the MIGHTY DEER® LICK—POCKET BLOCK®. This product is a lick block comprised of various ingredients including sweet corn. However, the block is comprised primarily of salt (93–98%) with Calcium and Phosphorus comprising another 1%. The remaining 1–6% comprising the remaining ingredients including sweet corn. Therefore, at most, a very small percentage of the MIGHTY DEER deer lick comprises sweet corn. This percentage is not dry mature sweet corn.

Consequently, it is a primary objective of the present invention to provide an attractant/scent cover apparatus and method comprised substantially entirely of dry mature sweet corn meal.

An additional objective of the present invention is to provide an attractant/scent cover apparatus and method comprising sweet corn meal which may be sprayed on the pants leg to cover human scent.

An additional objective of the present invention is to provide an attractant/scent cover apparatus and method comprising sweet corn meal which may be sprayed on trees, plants and the like to cover human scent and attract the wild game.

An additional objective is to provide a feed comprised substantially of sweet corn meal which can be formed into a variety of shapes for use in a variety of environments.

An additional objective is to provide a feed comprised substantially of sweet corn with added ingredients such as sunflower seeds, millet, peanut bits, thistle seeds and the like.

An additional objective is to provide a method of feeding wild game including the wild game feed of the present invention.

An additional objective is to provide a feed according to the teachings of the present invention which may be utilized as horse treats in the form of cubes, blocks, pellets, powder and the like.

An additional objective of the present invention is to provide an attractant/scent cover apparatus and method comprising a sufficiently economical material, such as sweet corn meal, which may be sprayed into the air in order to determine wind direction.

SUMMARY OF THE INVENTION

The present invention discloses a method for covering the scent of a human in order to avoid detection by wild game comprising providing a quantity of scent covering material comprising ground sweet corn meal. The scent covering material has a scent sufficiently strong so as to cover the scent of a human. A dispensing means is provided for containing the quantity of scent covering material. The dispensing means would comprise a storage compartment of resilient material and a dispensing nozzle releasably secured thereto such that upon exertion of pressure on the resilient storage compartment, a quantity of scent covering material is expelled therefrom and through the dispensing nozzle.

The scent cover may comprise dry mature sweet corn flour in combination with deer musk to further attract the wild game. Additionally, the method may include spraying a quantity of said scent cover on the pants leg of an individual; spraying a quantity of the scent cover material on surrounding trees and shrubs so as to attract deer and other wild game; and/or spraying a quantity of the scent covering material into the air in order to check the direction of the wind.

The invention also contemplates a method of attracting deer and other wild game for aesthetic pleasure comprising: providing a quantity of deer attracting material comprising a generally square block of compressed dry mature sweet corn meal adapted for consumption by deer and other wild game. Allowing the animal to lick the block thereby providing a quantity of the sweet corn for consumption and selecting a feeding area to which the wild game are to be attracted.

The invention further contemplates the combination of a quantity of scent covering material comprising ground dry sweet corn meal having a scent sufficiently strong so as to cover the scent of a human; a dispensing means for containing the quantity of scent covering material the dispensing means having, a storage compartment for containing the dry sweet corn meal, the storage compartment being formed of resilient material; and a dispensing nozzle releasably secured to the storage compartment, the dispensing nozzle having a flip-up dispenser valve having open and closed positions such that when the valve is in the closed position, release of the scent covering material is inhibited and such that upon placing the valve in the open position, and upon exertion of pressure on the resilient storage compartment, a quantity of scent dry sweet corn meal material is expelled from the dispensing means.

Finally, the invention discloses wild game attracting feed material comprised in large measure of compressed dry sweet corn meal adapted for consumption by wild game. The feed may take several different forms such as blocks, pellets, cubes, powder and may be formed into a shape compatible with feeding environment or as a coating used to encapsulate other feed products.

DESCRIPTION OF THE PREFERRED EMBODIMENT

The present invention discloses several apparatus embodiments and methods of use, all stemming from the inventor's discovery that sweet corn powder makes an extremely effective and economical scent cover, attractant and feed for animals. The scent cover/attractant material of the present invention is made from dry mature sweet corn meal. The sweet corn assumes a powdery consistency when ground into the sweet corn meal of the present invention. As is well understood by those in the art, natural sweet corn is very appetizing to all animals both wild and domestic. Additionally, sweet corn meal has a long 'shelf-life' and will stay fresh in storage for a considerable period of time.

Figure 1:
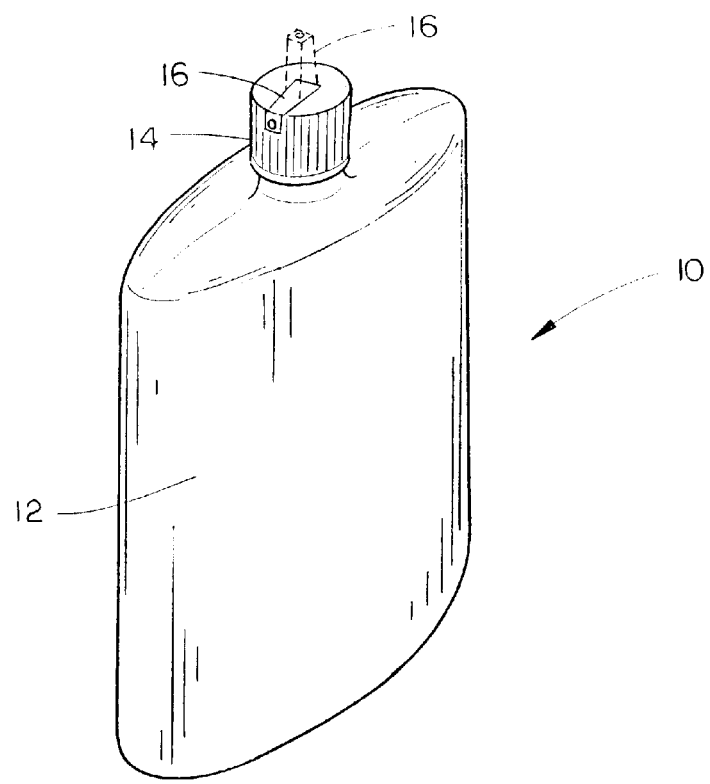
FIG. 1 is a perspective view of the dispensing bottle of the present invention.

In a first preferred apparatus, FIG. 1, for implementing a method of the present invention, a container 10 having a resilient body 12 of squeeze material, for containing the scent cover/attractant material. A cap 14 is fitted to the top of the resilient body 12. The cap 14 comprises a flip-up spout 16, movable between a generally horizontal closed position and a generally vertical open position shown in the figure. The squeezable, resilient nature of the bottle, in combination with the powdery consistency of the sweet corn meal, permits a measured dispensing of a quantity of powder by simply squeezing body 12.

Figure 2:
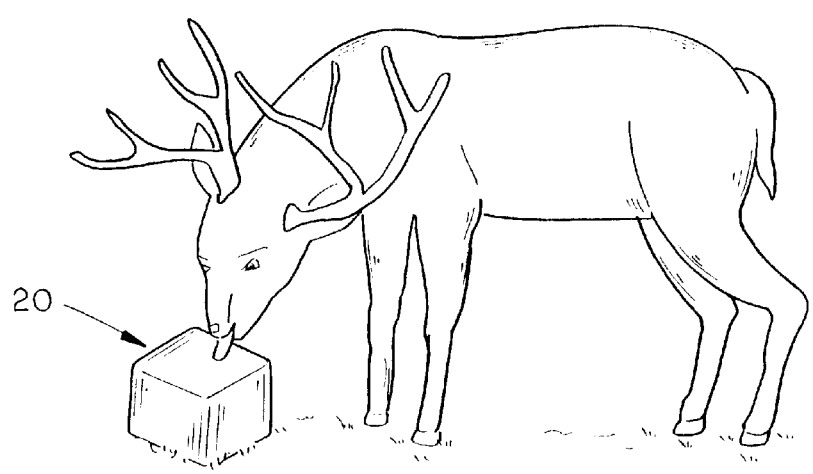
FIG. 2 is a perspective view of a feeding block of material and method of use wherein the block is placed on the ground to attract deer and other wildlife.

In a second apparatus for implementing the methods of the present inventions is illustrated in FIG. 2. As shown in this figure, the scent cover/attractant material has been formed into a solid cube 20. In a preferred embodiment, the cube is manufactured in an approximate 9 inch cube. In the preferred process for manufacturing the cube, the moisture content of the sweet corn meal, otherwise at approximately 5%, is elevated to approximately 15–17%. This moisture content meal to stick together when compressed into a cube.

Figure 6:
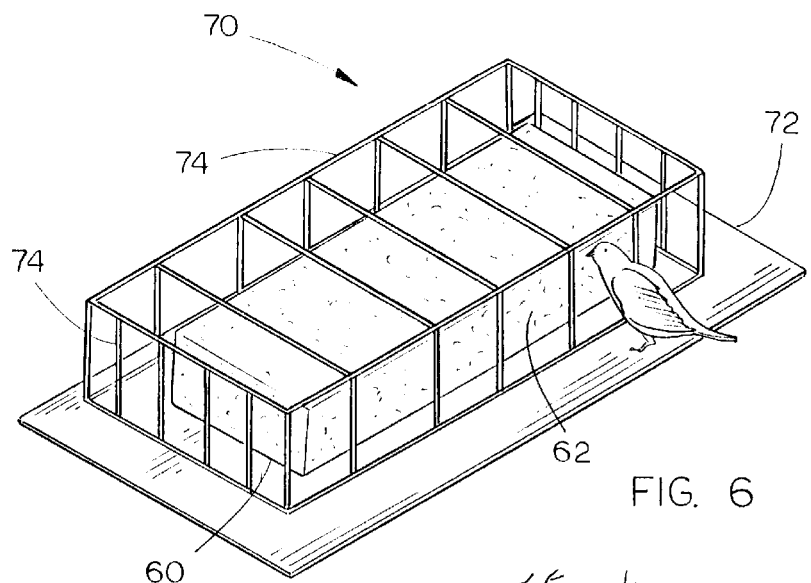
FIG. 6 is a perspective view showing both a particular form of the feed and a method for feeding birds.
Figure 7:
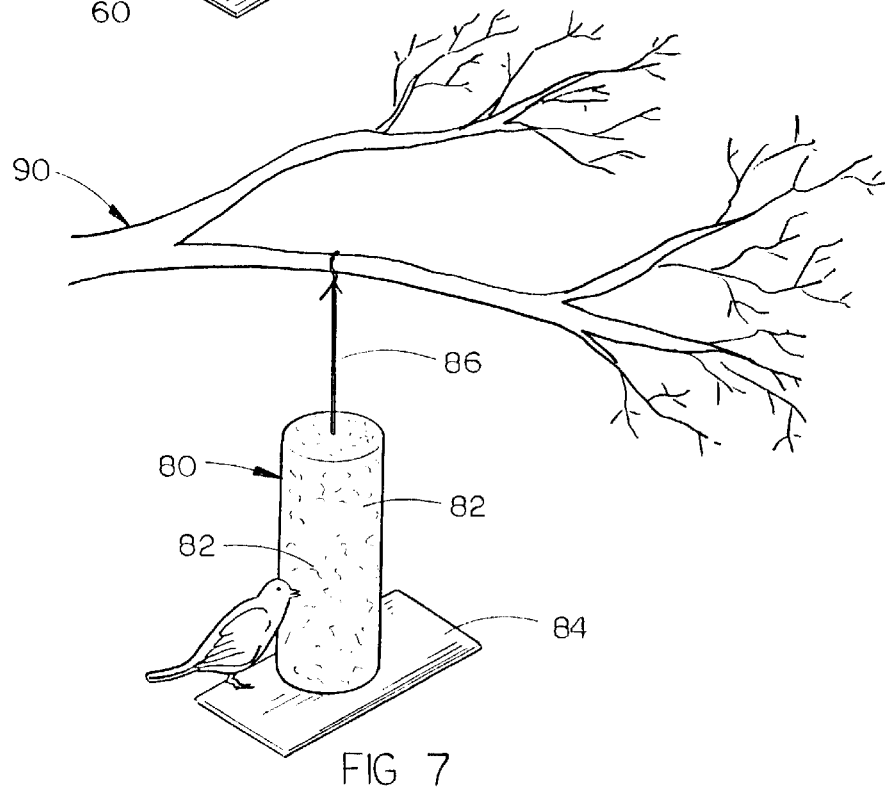
FIG. 7 is a perspective view of another feeding environment wherein the feed may be hung from a tree.

FIGS. 6 and 7 illustrate further forms the feed may take. In FIG. 6, the feed block has been formed into a generally rectangular shape 60 in correspondence to cage 70. Alternatively, FIG. 7 illustrates that the feed may be formed into a cylindrical shape. These embodiments and their methods of use are discussed in more detail below.

As mentioned, the present invention discloses several methods of using the scent cover/attractant of the present invention. The first of such methods involves the use of the container apparatus of FIG. 1.

Figure 3:
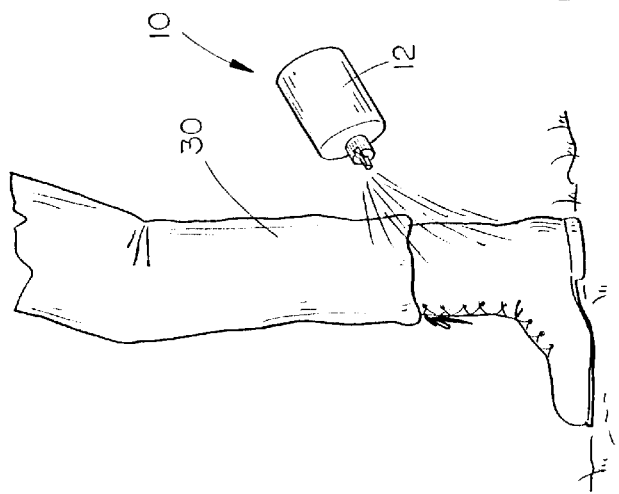
FIG. 3 is a perspective view of a first preferred method of using the invention wherein the scent covering material is sprayed on the pants leg.

With respect to the first methods, FIG. 3 illustrates the use of the sweet corn meal as a scent cover to cover the scent of the hunter. As seen in this figure, the method contemplates the spraying of a quantity of the cover material on the pants leg 30 of the hunter using container 10. The economical nature of the material permits a liberal amount to be sprayed without a great concern for accuracy as might be the case with some more expensive prior art materials. Additionally, the squeezable structure of the bottle body 12, and the powder nature of the sweet corn meal, allow a measured quantity of material to be expelled in a 'puff' therefrom.

Figure 4:
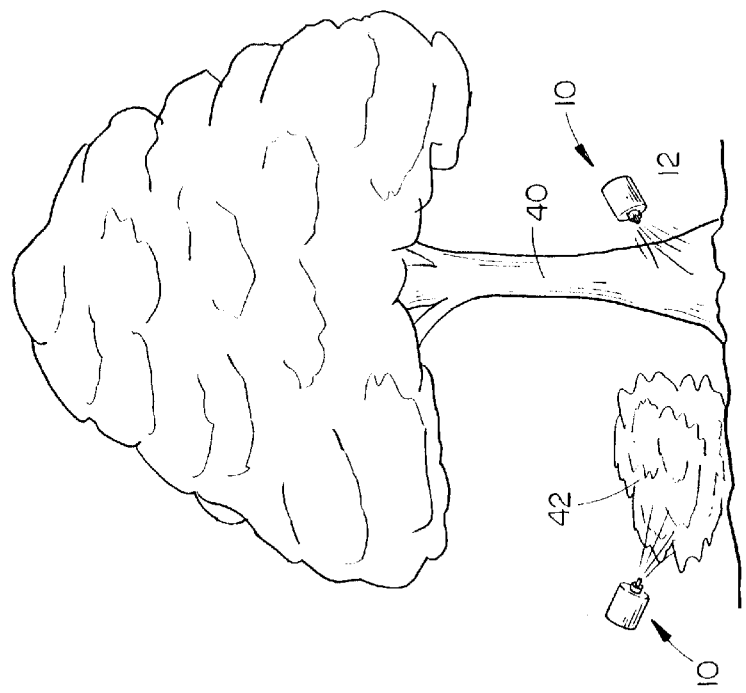
FIG. 4 is a perspective view illustrating a second preferred method of using the invention wherein the scent attractant material is being sprayed on trees and shrubs.

Another preferred method of using the material is illustrated in FIG. 4 wherein the scent cover/attractant is sprayed onto bushes 42, trees 40 and the like again using spray container 10. In this method is taught use of the material to both cover the scent of the hunter in the area while at the same time providing a scent which will attract the deer and other wild game to the area.

Figure 5:
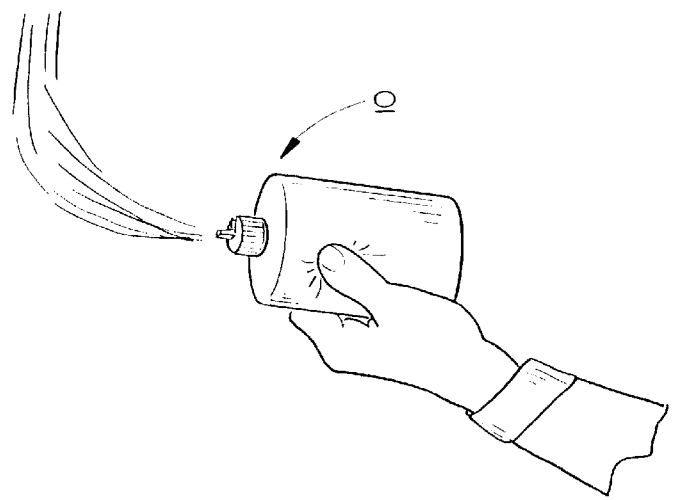
FIG. 5 is a perspective view illustrating a third preferred method of using the invention wherein the scent attractant material is being sprayed into the air in order to determine the wind direction.

FIG. 5 illustrates another method of use of the scent cover/attractant of the present invention in a manner, not related to either covering scent or attracting wild game. Rather, in this embodiment, the material is sprayed into the air using container 10 in order to check wind direction so. This is important for hunters so that they determine in what direction their scent, and that of the scent cover material, will carry. Use of the scent cover/attractant of the present invention as a wind checker, is made possible by the cost effectiveness thereof. As mentioned, several of the prior art materials are far too expensive to be used in this way. Additionally, many of the prior art materials are in liquid form rendering them inappropriate for this use, regardless of price.

As mentioned above, the cover/feed material of the present invention may take many forms depending on the employment method. In the scent cover uses just discussed material resides in a powder form, comprised substantially entirely of sweet corn. In the embodiment of FIG. 2 discussed above, the cube 20 is comprised substantially of sweet corn meal, however instead of powder form, it is compressed into a substantially solid block 20. This form is preferred for those methods directed to feeding animals such as deer or the like which might prefer a lick block for feed.

FIGS. 6 and 7 illustrate alternative feeding methods and correspondingly alternative forms of the animal feed. For example, FIG. 6 is a perspective view illustration how the feed might be formed and employed in a bird feed context. In this example, the feed may be formed into a generally rectangular block 60. This form corresponds to the generally rectangular shape of the cage 70 into which the feed would be placed. As observed in the figure, the cage 70 would likely comprise a generally horizontal surface 72 on which the birds may stand while feeding. The cage 70 would also likely comprise a number of horizontal and vertical bars 72 appropriately spaced to keep out unwanted animals.

While the material described above in connection with the scent cover and deer lick has been described as nearly completely comprising sweet corn, it is envisioned that some feeding environments such as that described in connection with FIG. 6, may include additional material. Such additional material may be chosen so as to be most appetizing to the animals being fed. For example, in the bird feeding context, it might be desirable to include bird seed, sunflower seeds, millet, peanut bits, thistle seeds and the like 62. While this list of materials is by no means exclusive, it does provide an example of materials which have been found attractive to birds.

In another embodiment illustrated in FIG. 7, a generally cylindrical form of the feed may be utilized. In this case, it is envisioned that the cylindrical feed form 80 would be hung from a tree branch 90 using a wire or other line 86. It is also envisioned that this embodiment may have horizontal surface 84 on which the animal may perch during feeding.

As with the prior embodiment, it is contemplated that the material used to form feed 80 may also comprise additional materials 82 in order to make the feed as appetizing to the animal as possible.

Figure 8:
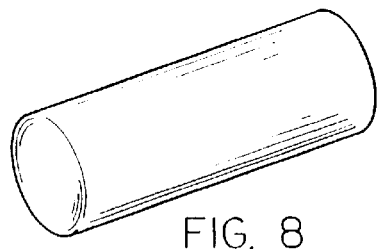
FIG. 8 is a perspective view of an extruded form of the attractant/feed material.
Figure 9:
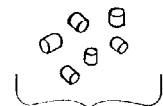
FIG. 9 is a perspective view of a pelleted form of the attractant/feed material.

Finally, it is contemplated that the above materials may be formed into pellets (FIG. 9), extruded (FIG. 8), cubes, or blocks for use as horse treats.

It is apparent that numerous other modifications and variations of the present invention are possible in view of the above teachings. For example, the means for securing the feeding apparatus to an upright member, may comprise nails, or brackets, etc. Additionally, the means for removably securing the animal feed block to the apparatus may similarly comprise a variety of means such as brackets and other attachment members.

Therefore, it is to be understood that the above description is in no way intended to limit the scope of protection of the claims and it is representative of only a couple of possible embodiments of the present invention. There has thus been shown and described an invention which accomplishes all of the stated objectives.

I claim:

1. A method for covering the scent of a human in order to avoid detection by wild game comprising:
    providing a quantity of scent covering material comprising ground sweet corn meal, said scent covering material having a scent designed to attract animals and sufficiently strong so as to cover the scent of a human;
    providing a dispensing means for containing said quantity of scent covering material, said dispensing means comprising a resilient storage compartment and a dispensing nozzle releasably secured thereto such that upon exertion of pressure on said resilient storage compartment, a quantity of scent covering material is expelled therefrom and through said dispensing nozzle; and
    dispensing a quantity of said scent covering material by exerting pressure on said resilient container.

2. The method for covering the scent of a human in order to avoid detection by wild game of claim 1 wherein said scent cover comprises sweet corn flour with deer musk.

3. The method for covering the scent of a human in order to avoid detection by wild game of claim 1 wherein the step of dispensing a quantity of scent covering material comprises spraying a quantity of said scent cover on a pants leg of an individual.

4. The method for covering the scent of a human in order to avoid detection by wild game of claim 1 wherein the step of dispensing a quantity of scent covering material comprises spraying a quantity of the scent covering material on surrounding trees and shrubs so as to attract deer and other wild game.

5. The method for covering the scent of a human in order to avoid detection by wild game of claim 1 wherein the step of dispensing a quantity of scent covering material comprises spraying a quantity of the scent covering material into the air in order to check the direction of the wind.

6. The method for covering the scent of a human in order to avoid detection by wild game of claim 1 wherein the step of providing a dispensing means having a dispensing nozzle comprises providing a nozzle having a flip-up dispenser valve with open and closed positions such that when said valve is in the closed position, release of said scent covering material is inhibited and such that upon placing said valve in said open position, and upon exertion of pressure on said resilient storage compartment, a quantity of scent covering material is expelled from said dispensing means.

7. In combination,
    a quantity of scent covering material comprising ground sweet corn meal, said scent covering material having a scent designed to attract animals and sufficiently strong so as to cover the scent of a human;
    a dispensing means for containing said quantity of scent covering material said dispensing means having,
        a resilient storage compartment containing said sweet corn meal, and
        a dispensing nozzle releasably secured to said resilient storage compartment, the dispensing nozzle having a flip-up dispenser valve having open and closed positions such that when said valve is in the closed position, release of said scent covering material is inhibited and such that upon placing said valve in said open position, and upon exertion of pressure on said resilient storage compartment, a quantity of scent sweet corn meal material is expelled from said dispensing means.

\* \* \* \* \*